(12) United States Patent
Roberts et al.

(10) Patent No.: US 9,535,627 B2
(45) Date of Patent: Jan. 3, 2017

(54) LATENCY-AWARE MEMORY CONTROL

(71) Applicant: Advanced Micro Devices, Inc., Sunnyvale, CA (US)

(72) Inventors: David A. Roberts, Santa Cruz, CA (US); Michael Ignatowski, Austin, TX (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 161 days.

(21) Appl. No.: 14/044,454

(22) Filed: Oct. 2, 2013

(65) Prior Publication Data

US 2015/0095605 A1 Apr. 2, 2015

(51) Int. Cl.
*G06F 12/00* (2006.01)
*G06F 13/00* (2006.01)
*G06F 3/06* (2006.01)
*G06F 13/16* (2006.01)

(52) U.S. Cl.
CPC ............ *G06F 3/0659* (2013.01); *G06F 3/068* (2013.01); *G06F 3/0611* (2013.01); *G06F 13/1642* (2013.01); *G06F 13/1668* (2013.01)

(58) Field of Classification Search
None
See application file for complete search history.

(56) References Cited

U.S. PATENT DOCUMENTS

| | | | |
|---|---|---|---|
| 8,166,316 B2 * | 4/2012 | Kapil | 713/300 |
| 2003/0220896 A1 * | 11/2003 | Gaertner | G06F 3/0601 |
| 2003/0235193 A1 * | 12/2003 | Hosaka | 370/389 |
| 2014/0281050 A1 * | 9/2014 | Vogan | 710/14 |

* cited by examiner

*Primary Examiner* — Farley Abad
*Assistant Examiner* — Richard B Franklin
(74) *Attorney, Agent, or Firm* — Volpe and Koenig, P.C.

(57) ABSTRACT

A system, method and computer-readable storage device for accessing heterogeneous memory system, are provided. A memory controller schedules access of a command to a memory region in a set of memory regions based on an access priority associated with the command and where the set of memory regions have corresponding access latencies. The memory controller also defers access of the command to the set of memory regions using at least two queues and the access priority.

21 Claims, 4 Drawing Sheets

LATENCY-AWARE MEMORY CONTROL

BACKGROUND

Field

The embodiments are generally directed to accessing memory using a memory controller and specifically to scheduling access to heterogeneous memory regions having various access latencies.

Background Art

Electronic devices include heterogeneous memory systems. These memory systems include volatile and non-volatile memories. Each of these memories has different characteristics, such as bit storage requirements and latency access. However, as a number of heterogeneous memory systems in the electronic device increases, what is needed is a memory controller that prioritizes memory access to heterogeneous memory devices and improves access speed and energy consumption.

BRIEF SUMMARY OF EMBODIMENTS

A system, method and computer-readable storage device for accessing heterogeneous memory system, are provided. A memory controller schedules access of a command to a memory region in a set of memory regions based on an access priority associated with the command and where the set of memory regions have corresponding access latencies. The memory controller also defers access of the command to the set of memory regions using at least two queues and the access priority.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the pertinent art to make and use the embodiments. Various embodiments are described below with reference to the drawings, wherein like reference numerals are used to refer to like elements throughout.

The embodiments will be described with reference to the accompanying drawings. Generally, the drawing in which an element first appears is typically indicated by the leftmost digit(s) in the corresponding reference number.

DETAILED DESCRIPTION OF EMBODIMENTS

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Electronic devices process data and provide thousands of applications to users. Example electronic devices include, but are not limited to, mobile phones, personal computers, workstations, and game consoles. Electronic devices use a central processing unit ("CPU") to process data. A CPU is a processor which carries out instructions of computer programs or applications. For example, a CPU carries out instructions by performing arithmetical, logical and input/output operations of the computer programs or applications. In an embodiment, the CPU performs sequential processing, that may include control instructions that include decision making code of a computer program or an application, and delegates processing to other processors in the electronic device, such as a graphics processing unit ("GPU").

A GPU is a processor that is a specialized electronic circuit designed to rapidly process mathematically intensive applications on electronic devices. The GPU has a highly parallel structure that is efficient for parallel processing of large blocks of data, such as mathematically intensive data of the computer graphics applications, images and videos. The GPU may receive data for processing from a CPU or generate data for processing from previously processed data and operations. In an embodiment, the GPU is a hardware-based processor that uses hardware to process data in parallel.

The CPU and GPU processors use commands to manipulate and process data on the electronic device. These commands and data are stored in a memory system of the electronic device. The memory system on the electronic device includes different types of memories. Example memory types include volatile or non-volatile memories. Example volatile memory includes a random access memory (RAM), dynamic random access memory (DRAM), and static random memory (SRAM). Volatile memory typically stores data as long as electronic device receives power, and loses data once the electronic device loses power. Example non-volatile memory includes read-only memory, flash memory, such as single-level cell (SLC) and multi-level cell (MLC) flash memories, Phase-Change Memory (PCM), ferroelectric RAM (F-RAM), hard disks, floppy disks, magnetic tape, optical discs, etc. Non-volatile memory retains its memory state when the electronic device loses power or is turned off.

Each of the different types of memory has different characteristics, such as different latency for accessing data. Volatile memory has low access latency for memory access, whereas non-volatile memory access often has high access latency. Similarly, different types of volatile and non-volatile memories, too, have different latencies.

In memory systems that include multiple memories, a non-volatile memory may be paired with a volatile memory. When properly managed, this pairing improves the speed of data access as well as reduces energy consumption during the data access on the electronic device.

Figure 1:
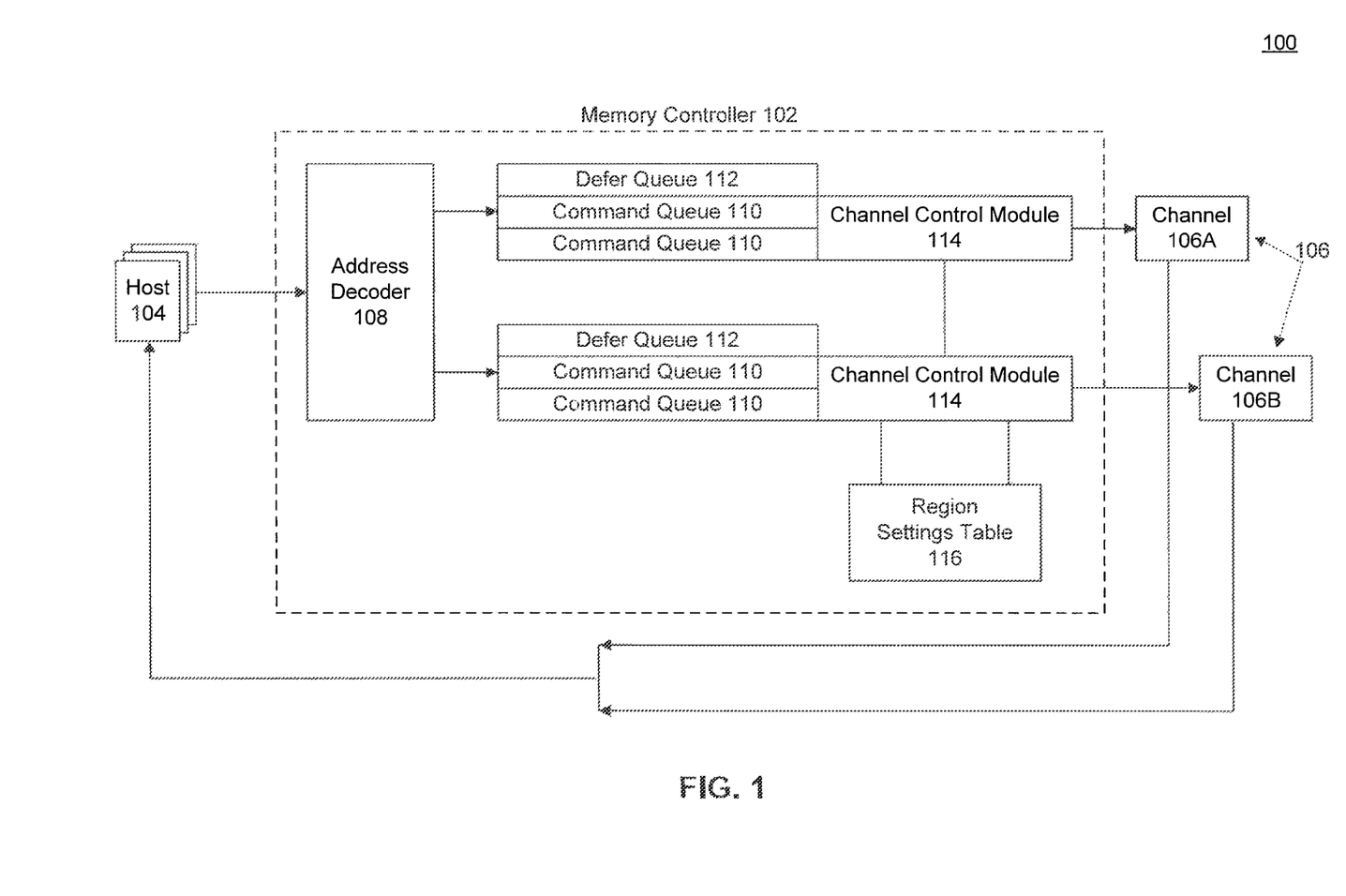
FIG. 1 is a block diagram of a system which includes a memory controller, according to an embodiment.

A memory controller manages memory access in a memory system having heterogeneous memories with different characteristics. FIG. 1 is a block diagram of a system 100 which includes a memory controller, according to an embodiment. A memory controller 102, in FIG. 1, is a hybrid memory controller that controls memory access to different memories in the memory system of an electronic device. Such a device, such as system 100, may in certain circumstances, advantageously provide enhanced performance (either through increase in processing performance or a decrease in power consumption, or both).

In an embodiment, memory controller 102 receives memory access requests from one or more hosts 104. Host 104 may be a CPU, a GPU, or any other processor that requires access a memory system of the electronic device. Memory controller 102 processes the access requests and based on the access requests either stores (writes) or retrieves (reads) data from one or more memories in the memory system.

In an embodiment, a memory system may be divided into multiple units of memory, called channels 106. Each channel 106 includes different regions where each region is associated with a different type or internal configuration of memory having a different latency. An example of a single type of memory having regions with different access latencies is a Flash memory containing SLC and MLC regions.

In an embodiment, channel 106 is divided into multiple banks. A bank may be an area in channel 106, such as, an array in one example that spans multiple regions. For instance, a bank in channel 106 may include both volatile and non-volatile memory regions, or regions with different characteristics such as latency or power. Each bank or portions of the bank may be accessed using a memory address or a range of memory addresses.

In an embodiment, channels 106 are coupled to memory controller 102 and store data as allocated by memory controller 102. For instance, for a write access request memory controller 102 may determine a region in channel 106 and a corresponding address to store the data.

In an embodiment, each channel 106 may be accessed in parallel with other channels 106 in the memory system. In block diagram 100, memory controller 102 connects to two channels 106, channel 106A and 106B, although the implementation is not limited to that embodiment.

In an embodiment, an address decoder 108 within memory controller 102 receives one or more access requests from host 104. Address decoder 108 decodes the address in the access request and maps the command included in the decoded address to a particular channel or combination of channels 106. In an embodiment, the logic for mapping the access request to a particular channel 106 may be hardwired within address decoder 108.

In an embodiment, the access request may be a read request or a write request. If the access request is a read request, the command in the access request includes a memory address of one or more channels 106 that stores data accessible using the address. If an access request is a write access request, the access request is associated with data that requires storage in channel 106.

In an embodiment, memory controller 102 includes command queues 110, defer queues 112 and channel control modules 114. Command queues 110 connect to channels 106. Unlike conventional memory controllers where a single command queue connects a particular channel, memory controller 102 includes multiple command queues 110 that connect to channels 106, with a subset of command queues 110 connecting to a particular channel 106, as shown in FIG. 1. In an embodiment, command queues 110 may be associated with a particular bank or region in channel 106. Once address decoder 108 selects channel 106 for the access request, address decoder 108 maps the command in access request to one or more of command queues 110 associated with the selected channel 106.

Unlike conventional queues that adhere to the first in, first out (FIFO) logic, command queues 110 can issue commands to access channel 106 from anywhere in command queues 110. A command issues when the command accesses channel 106 and reads or writes the data into channel 106.

In an embodiment, command queue 110 is divided into multiple slots. Each slot stores a command. Because commands may issue from any slot in command queue 110, commands associated with high latency transactions are prevented from blocking commands associated with low latency transactions in command queue 110.

Each slot may be associated with a particular slot priority. In an embodiment, command may be placed into a particular slot in command queue 110 according to a priority associated with the slot or the priority associated with the command. In this way, low latency commands are placed into the slots associated with low priority and high latency commands into the slots associated with a higher priority. This type of prioritization improves the overall throughput in command queue 110 by preventing banks from being blocked for prolonged periods of time by commands having high latency access.

In a further embodiment, at least one slot in command queue 110 is reserved for a particular region in channel 106 having a particular latency level. In this embodiment, a command placed into a reserved slot is guaranteed to issue and access the particular memory region.

In an alternative embodiment, each command queue 110 may be divided into multiple sub-queues, with each sub-queue storing commands for a particular region in channel 106. In this embodiment, the sub-queues store commands that access a portion of the bank that corresponds to the particular region.

In an embodiment, memory controller 102 also includes one or more defer queues 112. A defer queue 112 may be associated with a particular channel 106 and corresponding command queues 110. In block diagram 100 there is one defer queue 112 for each channel 106, though the implementation is not limited to this embodiment.

Defer queues 112 may be divided into multiple slots. The slots store commands deferred from command queue 110 to defer queue 112, as discussed below.

In an embodiment, defer queue 112 may be located within volatile or non-volatile memory, such as, SRAM associated with memory controller 102 or in a reserved portion of a memory system in the electronic device.

In an embodiment, memory controller 102 includes one or more channel control modules 114. Channel control module 114 includes channel control logic and timing constraints for commands in command queue 110, as well as logic for moving commands between command queue 110 and defer queue 112. In an embodiment, one channel control module 114 may be associated with each channel 106 as shown in block diagram 100, although the implementation is not limited to this embodiment.

Channel control module 114 determines access priority for each command in command queue 110. Based on the determined access priority and slot availability, channel control module 114 places the command into a slot in command queue 110. The logic that channel control module 114 uses to determine access priority of the command is discussed below.

In an embodiment, channel control module 114 temporarily defers commands in command queues 110 to defer queue 112. This may occur when command queues 110 have more low priority commands then available corresponding slots, or a number of high priority commands that require access to channel 106. When channel control module 114 defers commands from command queue 110 to defer queue 112, slots are freed in command queue 110 for commands having a higher priority access, such as commands with low latency or commands from critical processes in the electronic device. Example deferred commands include paused writes, or high-MLC and low priority commands.

In an embodiment, commands that channel control logic 114 defers to defer queue 112 are ready for issuance. This means that the command may be in the process of accessing or is ready to access a particular bank, and may have issued but for other commands having higher priority. As such, commands stored in defer queue 112 sometimes need not be rechecked for being issuable when channel control module 114 transfers the commands back to command queue 110. Because commands need not be rechecked for issuance, memory controller 102 saves both power and processing time when the deferred commands are restored to command queue 110.

In an embodiment, channel control module 114 moves commands stored in defer queue 112 back to command queues 110. In one example, channel control module 114 moves commands from defer queue 112 to command queue 110 when a slot with a priority corresponding to the priority of the command becomes available. In another example, channel control module 114 may store commands in defer queue 112 for a predefined maximum time. The maximum time may be configured using an electronic device and is a constraint on how long commands may remain in defer queue 112. Once the storage time for a command in defer queue 112 exceeds the maximum time, channel control module 114 moves the deferred command from defer queue 112 to command queue 110. For example, channel control module 114 may move the command into a slot in command queue 110 that is reserved for commands that have reached the maximum time constrain and timed-out of defer queue 112. In an embodiment, command queue 110 has a reserved slot for each memory region accessible from command queue 110 in channel 106.

In another embodiment, defer queue 112 may also store incoming commands from address decoder 108 when all slots for the targeted region of channel 106 in command queue 110 are full. For example, memory controller 102 may attempt to assign higher priority commands to regions in channel 106, when no slots are available in command queues 110 for that region. To make space for these slots in command queue 110 to process the higher priority commands, channel control module 114 may temporarily move the lower priority commands from command queue 110 to defer queue 112. This allows the higher priority commands to temporarily steal slots in command queue 110 from lower priority commands for a particular region.

In an embodiment, channel control module 114 also enforces read and write modes for commands in command queue 110 and defer queue 114. To enforce read and write modes, channel control module 114 uses a region settings table 116. Region setting table 116 includes mode settings associated with different regions in channels 106. For example, region setting table 116 includes address ranges that specify regions or banks in channels 106 and different latencies associated with each region. In an embodiment, region setting table 116 is a programmable table.

In an embodiment, in lieu of region settings table 116, read and write settings, as well as latencies associated with the regions, may also be transmitted from host 104 as part of the access request message.

Below, is an exemplary description of different mode settings that may be stored in region settings table 116 or received from host 104.

In an embodiment, a mode setting includes a bit per cell mode. For example, an MLC memory region may be programmed to store a variable number of bits in a memory cell, typically up to four. The bit per cell mode allows memory controller 102 to vary the number of stored bits in the MLC memory region. A person skilled in the art will appreciate that this setting may cause the latency associated with processing a command for the region to vary with the number of stored bits.

In another embodiment, a mode setting may include read and write priorities associated with each addressable region. For example, region settings table 116 may be programmed to allow regions with fewer bits per cell, SLC, or write pausing enabled regions (regions where a write instructions may be paused prior to completion) to have higher priority for read access requests than other memory regions. In another example, region settings table 116 may be programmed to store a number of reserved slots in command queues 110 for each region or bank. These allows priority settings in region setting table 116 to modify the default priorities where lower latency commands get priority and set low level priority setting to prioritize commands from critical tasks.

In another embodiment, mode settings may also include a write truncation mode. In a write truncation mode a portion of the data and not the entire data is written in to a memory region at a time. In an embodiment, commands in the write truncation mode may also have a higher priority than other commands in command queue 110.

In an embodiment, channel control module 114 also determines default priority settings. For instance channel control module 114 calculates the predicted latency of each pending command. As part of calculating the predicted latency of each pending command, channel control module 114 takes into account the value of data that is written or read from the memory region. The value of data is calculated because some values are faster to write into memory regions than others. For instance, it may be faster to write a "0" into a memory region than a "1".

In another embodiment, channel control module 114 also schedules low latency commands over high latency commands. For instance, commands associated with a low latency region may be scheduled before the commands associated with a high latency region. One way to schedule the commands is to assign a low or high priority to each command in command queue 110, or to assign commands to a slot in command queue 110 associated with a particular priority.

In an embodiment, channel control module 114 uses priority settings from region setting table 116 to modulate the automatic priority selection. For instance, channel control module 114 prioritizes commands from critical devices within electronic device prior to other commands in command queue 110. This may cause channel control module 114 to move a command having a low priority into defer queue 112 to open up a slot in command queue 110 for a command associated with a critical device.

In an embodiment, read and write commands may be paused while the commands access channel 106. For example, to move commands from command queue 110 to defer queue 112, channel control module 114 pauses a read or write request with a lower priority, and removes the read or write request from command queue 110. Along with the request, channel control module 114 also saves the state of the paused command. Channel control module 114 then moves the paused command and its state in defer queue 112 and vacates the slots in command queue 110 associated with the moved command. This allows command queue 110 to have slots available for incoming access requests whose commands have a higher priority than the paused command or for critical commands. For example, read requests may have a higher priority than the write requests, and read SLC requests may have a higher priority than read MLC requests, for a particular region in channel 106.

When channel control module 114 reinstates the command back to command queue either due to a slot opening or the maximum time constraint, channel control module 114 also reinstates the state of the command. In this way, a command that was paused prior to being deferred to defer queue 112 begins execution from the saved state—that is the state prior to the pause.

Once a command completes the read or write access of a bank or region in channel 106, the results of the access are transmitted to host 104. In an embodiment, the results of the access may be data associated with the read access request or a confirmation of completion or failure of the write access request.

Figure 2:
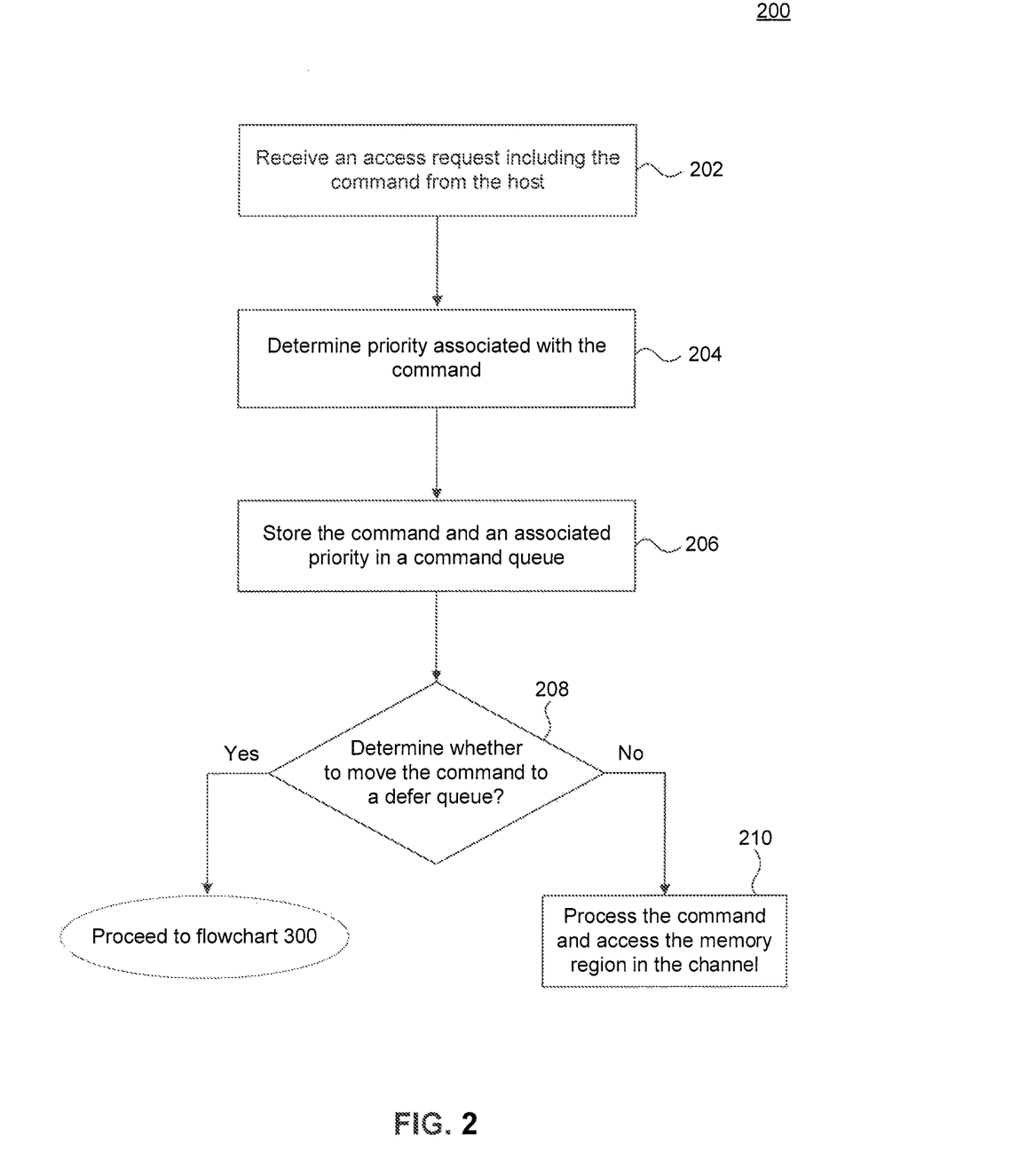
FIG. 2 is a flowchart for a method for processing access requests, according to an embodiment.

FIG. 2 is a flowchart for a method 200 for processing access requests, according to an embodiment.

At operation 202, an access request is received. For instance, memory controller 102 receives an access request from host 104. Once received, address decoder 108 identifies a command in the access request and maps the command to one or more channels 106.

At operation 204, an access priority of the command is determined. For instance, channel control module 114 determines an access priority of the command based on whether it is a read or a write command, type and value of data that requires access, and types of memory regions in channel 106 that the command will access, to name a few examples.

At operation 206, a command is stored in a command queue. For instance, address decoder 108 stores the command in one or more slots in command queue 110 associated with the mapped channel 106. As discussed above, the access priority of the command may determine the slot that command is stored in command queue 110.

Figure 3:
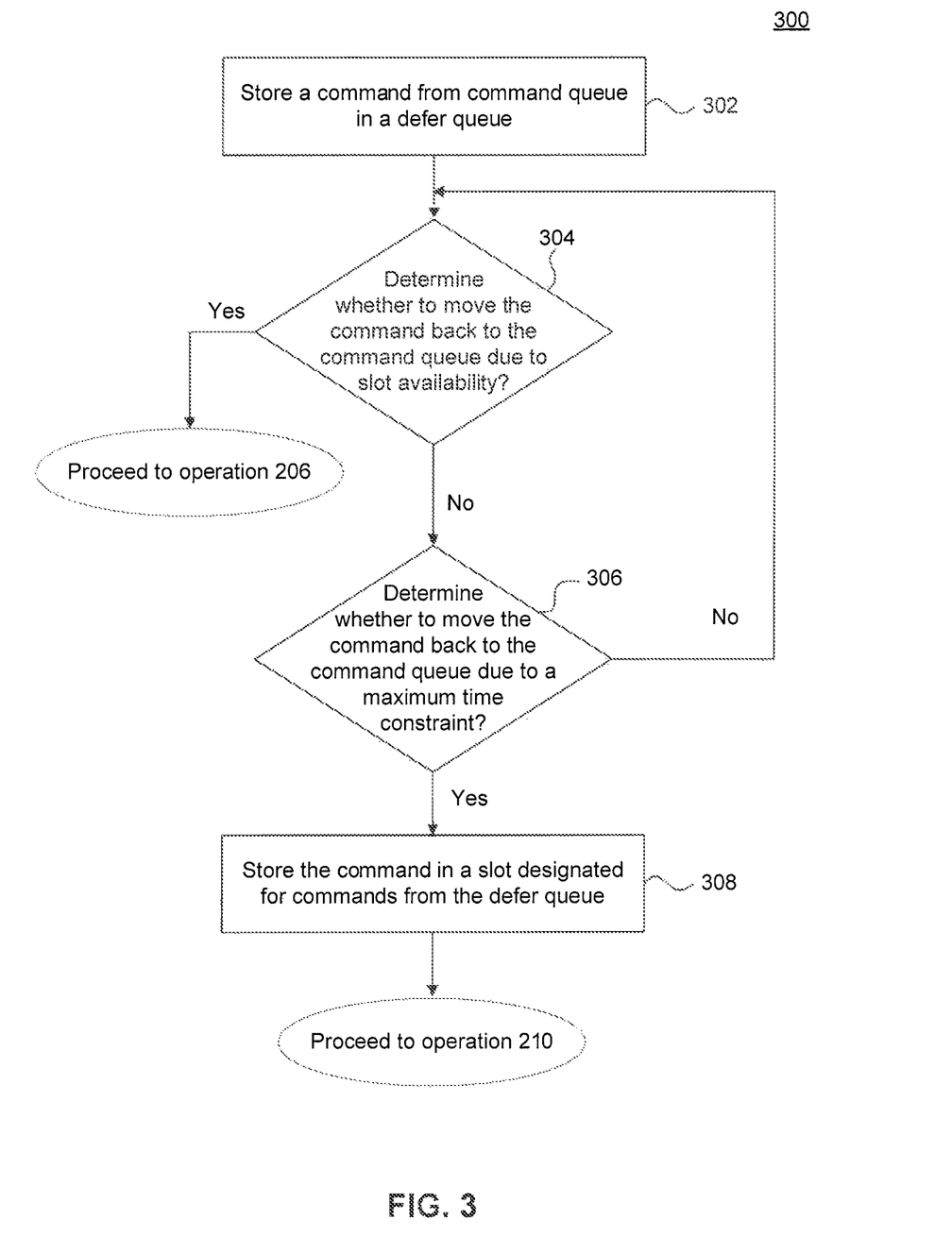
FIG. 3 is a flowchart of a method for processing requests in a defer queue, according to an embodiment.

At operation 208, a determination is made to move the command to a defer queue. For instance, channel control module 114 may determine that the slots in command queue 110 are required for other commands having a higher priority, and move the command stored at operation 206 to defer queue 112. If channel command module 114 moves the command to a defer queue 112, the flowchart proceeds to method 300, discussed below. Otherwise, to operation 210. In an embodiment, operation 208 may occur at periodic time intervals, such as on every clock cycle, until the command proceeds to method 300 or operation 210.

At operation 210, a command is processed. For instance, memory controller 102 issues the command from command queue 110 to access channel 106 for read or write access as specified in the command. Once the access completes, the result of the access is sent to host 104.

FIG. 3 is a flowchart of a method 300 for processing requests in a defer queue, according to an embodiment.

At operation 302, a command is stored in a defer queue. For instance, defer queue 112 receives a command from one of command queues 110 associated with channel 106 and stores the command.

At operation 304, a determination is made whether to move the command back to command queue due to slot availability. For instance, channel control module 114 determines whether a slot is available in command queue 110 for storing the command stored in defer queue 112. In an embodiment, channel control module 114 makes the determination based on the priority associated with the command of operation 302 and the slot in command queue 110. If channel control module 114 determines that the slot is available, the flowchart proceeds to operation 206 in method 200. Otherwise to operation 306. In an embodiment, operation 304 may occur at periodic time intervals, such as on every clock cycle, until the command proceeds to operation 206 or 306.

At operation 306, a determination is made whether to move the command back to the command queue due to a maximum time constraint. For instance, to avoid the command from being stored in defer queue 112 indefinitely and the negative consequences, such as, deadlocks, that may result from same, channel control module 114 assigns a maximum time constraint that a command may remain in defer queue 112. If the time that command is stored in defer queue 112 exceeds the maximum time constraint, the flowchart proceeds to operation 308, otherwise to operation 302. In an embodiment, operation 304 may occur at periodic time intervals, such as on every clock cycle, until the command proceeds to operation 308 or 302.

At operation 308, the command is stored in a reserved slot in the command queue. For instance, the command is stored in a slot in command queue 110 reserved for commands that have timed out of defer queue 112. After operation 308, the method proceeds to operation 210 in method 200.

Figure 4:
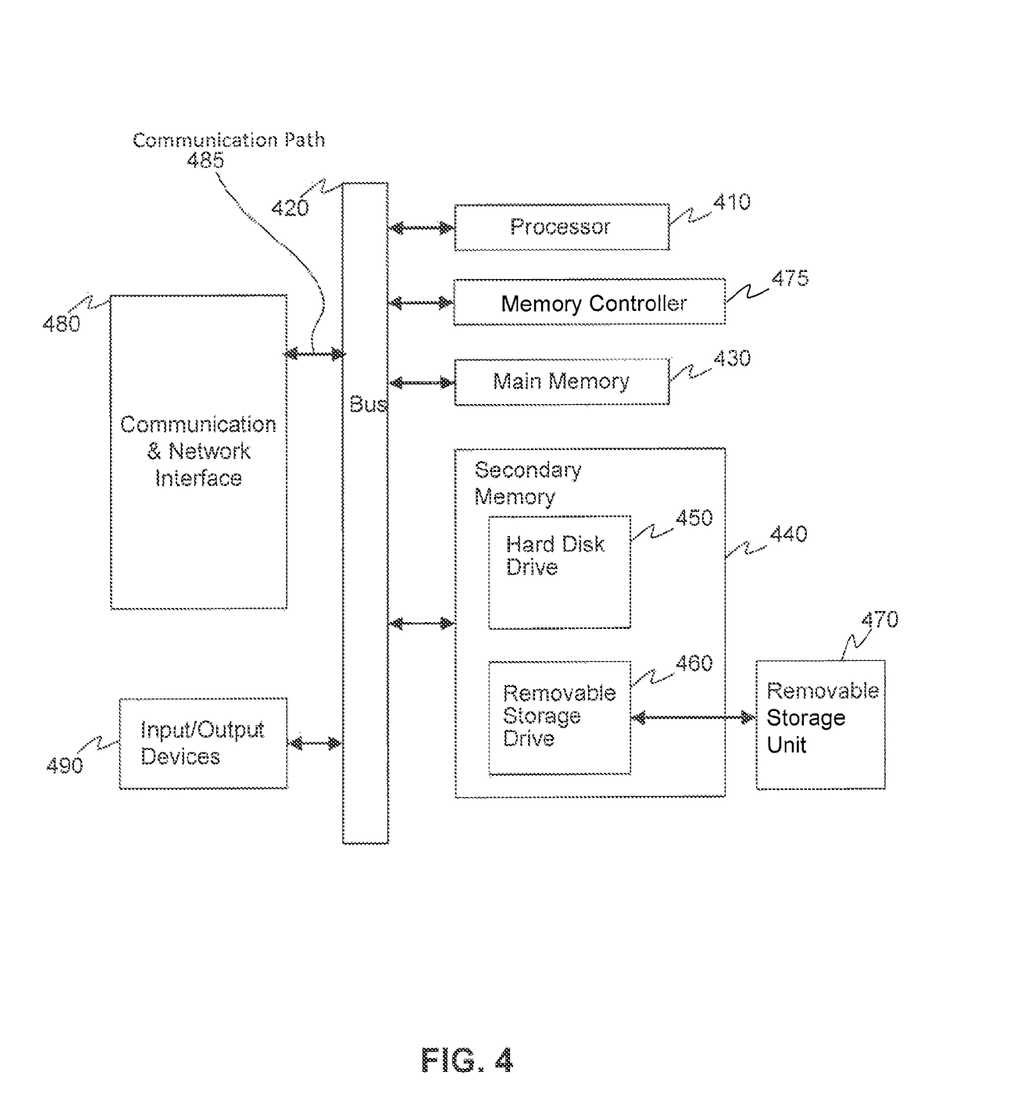
FIG. 4 is a block diagram of an exemplary electronic device where embodiments may be implemented.

Various aspects of the disclosure can be implemented by software, firmware, hardware, or a combination thereof. FIG. 4 illustrates an example computer system 400 in which the contemplated embodiments, or portions thereof, can be implemented as computer-readable code. For example, the methods illustrated by flowcharts described herein can be implemented in system 400. Various embodiments are described in terms of this example computer system 400. After reading this description, it will become apparent to a person skilled in the relevant art how to implement the embodiments using other computer systems and/or computer architectures.

Computer system 400 includes one or more processors, such as processor 410. Processor 410 can be a special purpose or a general purpose processor. Processor 410 is connected to a communication infrastructure 420 (for example, a bus or network). Processor 410 may include CPU or a GPU processor.

Computer system 400 also includes a main memory 430, and may also include a secondary memory 440. Main memory may be a volatile memory or non-volatile memory, and divided into channels as discussed above. Secondary memory 440 may include, for example, non-volatile memory such as a hard disk drive 450, a removable storage drive 460, and/or a memory stick. Removable storage drive 460 may comprise a floppy disk drive, a magnetic tape drive, an optical disk drive, a flash memory, or the like. The removable storage drive 460 reads from and/or writes to a removable storage unit 470 in a well-known manner. Removable storage unit 470 may comprise a floppy disk, magnetic tape, optical disk, etc. which is read by and written to by removable storage drive 460. As will be appreciated by persons skilled in the relevant art(s), removable storage unit 670 includes a computer usable storage medium having stored therein computer software and/or data.

In alternative implementations, secondary memory 440 may include other similar means for allowing computer programs or other instructions to be loaded into computer system 400. Such means may include, for example, a removable storage unit 470 and an interface (not shown). Examples of such means may include a program cartridge and cartridge interface (such as that found in video game devices), a removable memory chip (such as an EPROM, or PROM) and associated socket, and other removable storage units 470 and interfaces which allow software and data to be transferred from the removable storage unit 470 to computer system 400.

Computer system 400 may also include a memory controller 475. Memory controller 475 includes functionality of memory controller 102, described above, and controls data access to main memory 430 and secondary memory 440.

Computer system 400 may also include a communications and network interface 480. Communication and network interface 480 allows software and data to be transferred between computer system 400 and external devices. Communications and network interface 480 may include a modem, a communications port, a PCMCIA slot and card, or the like. Software and data transferred via communications and network interface 480 are in the form of signals which may be electronic, electromagnetic, optical, or other signals capable of being received by communication and network interface 480. These signals are provided to communication and network interface 480 via a communication path 485. Communication path 485 carries signals and may be implemented using wire or cable, fiber optics, a phone line, a cellular phone link, an RF link or other communications channels.

The communication and network interface 480 allows the computer system 400 to communicate over communication networks or mediums such as LANs, WANs the Internet, etc. The communication and network interface 480 may interface with remote sites or networks via wired or wireless connections.

In this document, the terms "computer program medium" and "computer usable medium" and "computer readable medium" are used to generally refer to media such as removable storage unit 470, removable storage drive 460, and a hard disk installed in hard disk drive 450. Signals carried over communication path 485 can also embody the logic described herein. Computer program medium and computer usable medium can also refer to memories, such as main memory 430 and secondary memory 440, which can be memory semiconductors (e.g. DRAMs, etc.). These computer program products are means for providing software to computer system 400.

Computer programs (also called computer control logic) are stored in main memory 430 and/or secondary memory 440. Computer programs may also be received via communication and network interface 480. Such computer programs, when executed, enable computer system 400 to implement embodiments as discussed herein. In particular, the computer programs, when executed, enable processor 410 to implement the disclosed processes, such as the steps in the methods illustrated by flowcharts discussed above. Accordingly, such computer programs represent controllers of the computer system 400. Where the embodiments are implemented using software, the software may be stored in a computer program product and loaded into computer system 400 using removable storage drive 460, interfaces, hard drive 450 or communication and network interface 480, for example.

The computer system 400 may also include input/output/display devices 490, such as keyboards, monitors, pointing devices, etc.

Embodiments can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a CPU core and/or a GPU core) that is embodied in program code and may be transformed to hardware as part of the production of integrated circuits.

The embodiments are also directed to computer program products comprising software stored on any computer-usable medium. Such software, when executed in one or more data processing devices, causes a data processing device(s) to operate as described herein or, as noted above, allows for the synthesis and/or manufacture of electronic devices (e.g., ASICs, or processors) to perforin embodiments described herein. Embodiments employ any computer-usable or -readable medium, and any computer-usable or -readable storage medium known now or in the future. Examples of computer-usable or computer-readable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nano-technological storage devices, etc.), and communication mediums (e.g., wired and wireless communications networks, local area networks, wide area networks, intranets, etc.).

It is to be appreciated that the Detailed Description section, and not the Summary and Abstract sections, is intended to be used to interpret the claims. The Summary and Abstract sections may set forth one or more but not all exemplary embodiments as contemplated by the inventor(s), and thus, are not intended to limit the embodiments and the appended claims in any way.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system comprising:
   a memory controller comprising a first queue connected to a set of memory regions accessible to a command and a second queue associated with the first queue, the set of memory regions comprising at least one volatile memory region and at least one non-volatile memory region, the memory controller configured to:
   receive an access request, including the command, to access the at least one volatile memory region of the set of memory regions or the least one non-volatile memory region of the set of memory regions;
   determine an access priority associated with the command from a plurality of different access priorities;
   schedule the command to access the at least one volatile memory region or the at least one non-volatile memory region by storing the command and the determined access priority associated with the command into one of multiple command queue slots of the first queue;
   defer scheduling of the command to access the at least one volatile memory region or the at least one non-volatile memory region by moving the command from the first queue to one of multiple defer queue slots of the second queue based on the determined access priority of the command and access priorities of one or more other commands stored in one or more other command queue slots of the first queue scheduled to access the at least one volatile memory region or the at least one non-volatile memory region;
   return the command to the first queue; and
   cause any of the scheduled command and the one or more other scheduled commands to access the at least one volatile memory region or the at least one non-volatile memory region prior to causing another of the scheduled command and the one or more other commands to access the at least one volatile memory region or the at least one non-volatile memory region based on the determined access priorities of the command and the one or more other commands.

2. The system of claim 1, wherein the defer queue is configured to store the command until one of the command queue slots is available in the command queue.

3. The system of claim 1, wherein the memory controller is further configured to return the command to the first queue on a condition that the command is stored in the defer queue for a storage time equal to or greater than a threshold storage time.

4. The system of claim 3, further comprising:
   a channel control module configured to move the command from the defer queue to a reserved slot in the command queue, wherein the reserved slot is reserved for the command moved back from the defer queue, when the command was stored in the defer queue longer than the maximum time constraint.

5. The system of claim 1, wherein the memory controller further comprises a channel control module configured to determine the access priority of the command.

6. The system of claim 1, wherein the access priority is a function of a latency of a command that accounts for value of data associated with the command.

7. The system of claim 1, wherein the access priority is a function of an access latency corresponding to the memory region.

8. The system of claim 1, further comprising a region settings table configured to store mode settings for address ranges associated with the set of memory regions; and
   wherein the access priority is a function of the mode settings associated with the memory region accessible to the command.

9. The system of claim 1, further comprising a host processor configured to transmit the command to the memory controller.

10. The system of claim 1, wherein the first queue comprises:
    a first set of one or more command queue slots each configured to store the scheduled command and each being associated with a first access priority; and
    a second set of one or more command queue slots each configured to store the scheduled command and associated with a second access priority different from the first access priority, and
    the memory controller is further configured to store the scheduled command into one of: (i) one of the first set of command queue slots when the determined access priority associated with the scheduled command corresponds to the first access priority; and (ii) one of the second set of command queue slots when the determined access priority associated with the scheduled command corresponds to the second access priority.

11. The system of claim 10, wherein the memory controller is further configured to return the command to the first queue when one of: (i) the determined access priority associated with the command corresponds to the first access priority and the one of the first set of command queue slots is available; and (ii) the determined access priority associated with the command corresponds to the second access priority and the one of the second set of command queue slots is available.

12. The system of claim 10, wherein the first access priority is based on accessing the volatile memory region and the second access priority is based on accessing the non-volatile memory region, and
    the memory controller is further configured to store the scheduled command into one of: (i) a slot of the first set of command queue slots when the determined access priority associated with the scheduled command corresponds to the first access priority; and (ii) a slot of the second set of command queue slots when the determined access priority associated with the scheduled command corresponds to the second access priority.

13. A method comprising:
receiving, by a memory controller, an access request, including a command, to access a memory region of a set of memory regions comprising at least one volatile memory region and at least one non-volatile memory region;
determining an access priority associated with the command from a plurality of different access priorities;
scheduling the command in the memory controller to access the at least one volatile memory region or the at least one non-volatile memory region by storing the command and the determined access priority associated with the command into one of multiple command queue slots of a first queue connected to the set of memory regions accessible to the command;
deferring scheduling of the command to access the at least one volatile memory region or the at least one non-volatile memory region by moving the command from the first queue to one of multiple defer queue slots of a second queue associated with the first queue based on the determined access priority of the command and access priorities of one or more other commands stored in one or more other command queue slots of the first queue and scheduled to access the at least one volatile memory region or the at least one non-volatile memory region;
returning the deferred command to the first queue; and
causing any of the scheduled command and the one or more other scheduled commands to access the at least one volatile memory region or the at least one non-volatile memory region prior to causing another of the scheduled command and the one or more other commands to access the at least one volatile memory region or the at least one non-volatile memory region based on the determined access priorities of the command and the one or more other commands.

14. The method of claim 13, further comprising storing the command in the defer queue until one of the command queue slots is available in the command queue.

15. The method of claim 13, further comprising returning the command to the first queue on a condition that the command is stored in the defer queue for a storage time equal to or greater than a threshold storage time.

16. The method of claim 15, further comprising: moving the command from the defer queue to a reserved slot in the command queue, wherein the reserved slot is reserved for the command moved back from the defer queue, when the command was stored in the defer queue longer than the maximum time constraint.

17. The method of claim 13, wherein the access priority is a function of a latency of a command that accounts for value of data associated with the command.

18. The method of claim 13, wherein the access priority is a function of an access latency corresponding to the memory region.

19. The method of claim 13, further comprising: storing mode settings for address ranges associated with the set of memory regions in a region settings table, and wherein the access priority is a function of the mode settings associated with the memory region accessible to the command.

20. The method of claim 13, further comprising:
transmitting, using the host processor, the command to the memory controller.

21. A non-transitory computer-readable storage device having instructions stored thereon, execution of which by a processor cause a memory controller to perform the operations comprising:
receiving, by a memory controller, an access request, including a command, to access a memory region of a set of memory regions comprising at least one volatile memory region and at least one non-volatile memory region;
determining an access priority associated with the command from a plurality of different access priorities;
scheduling the command in the memory controller to access the at least one volatile memory region or the at least one non-volatile memory region by storing the command and the determined access priority associated with the command into one of multiple command queue slots of a first queue connected to the set of memory regions accessible to the command;
deferring scheduling of the command to access the at least one volatile memory region or the at least one non-volatile memory region by moving the command from the first queue to one of multiple defer queue slots of a second queue associated with the first queue based on the determined access priority of the command and access priorities of one or more other commands stored in one or more other command queue slots of the first queue and scheduled to access the at least one volatile memory region or the at least one non-volatile memory region;
returning the deferred command to the first queue; and
causing any of the scheduled command and the one or more other scheduled commands to access the at least one volatile memory region or the at least one non-volatile memory region prior to causing another of the scheduled command and the one or more other commands to access the at least one volatile memory region or the at least one non-volatile memory region based on the determined access priorities of the command and the one or more other commands.

* * * * *